US005082705A

United States Patent [19]
Rose

[11] Patent Number: 5,082,705
[45] Date of Patent: Jan. 21, 1992

[54] CARPET UNDERLAY

[75] Inventor: Robert J. Rose, Chesterfield, Va.

[73] Assignee: E. R. Carpenter Company, Inc., Richmond, Va.

[21] Appl. No.: 547,072

[22] Filed: Jul. 3, 1990

[51] Int. Cl.⁵ .................. B32B 7/12; B32B 33/00; D06N 7/00
[52] U.S. Cl. .......................... 428/40; 428/85; 428/95; 428/304.4; 428/317.1; 428/352
[58] Field of Search ............. 428/40, 85, 95, 304.4, 428/317.1, 352

[56] References Cited

U.S. PATENT DOCUMENTS

| | | | |
|---|---|---|---|
| 3,039,907 | 6/1962 | Scholl | 428/40 |
| 4,557,774 | 12/1985 | Hoopengardner | 156/71 |
| 4,647,484 | 3/1987 | Higgins | 428/95 X |

FOREIGN PATENT DOCUMENTS 8504150  9/1985  World Int. Prop. O. ....... 428/317.1

Primary Examiner—George F. Lesmes
Assistant Examiner—Terrel Morris
Attorney, Agent, or Firm—Beveridge, DeGrandi & Weilacher

[57] ABSTRACT

A carpet underlay is described which consists of a cushion layer having a scrim layer attached to its undersurface by a solvent adhesive. The upper layer also has a solvent adhesive applied thereto and a double adhesive coated film is securely affixed to the cushion surface by the solvent adhesive layer and the adhesive on the film. A release film is disposed above the upper layer of the double adhesive coated film.

8 Claims, 1 Drawing Sheet

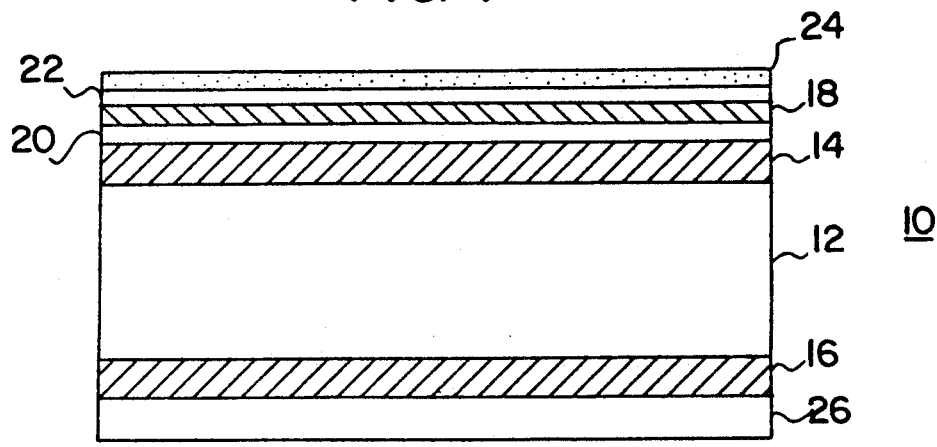
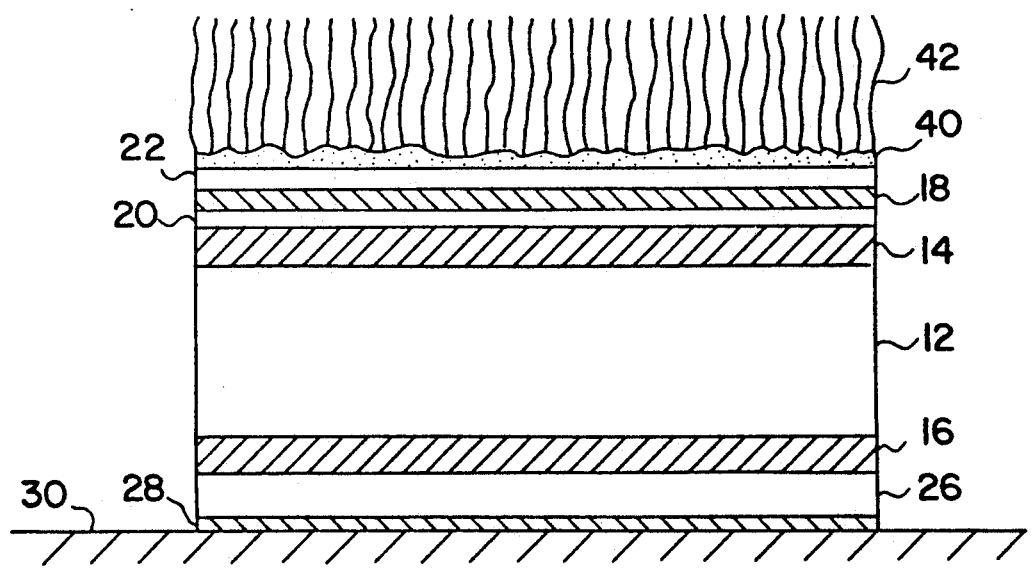

CARPET UNDERLAY

BACKGROUND OF THE INVENTION

This invention relates to an improved carpet underlay which provides a comfortable feeling to the person walking on the carpet placed thereover while eliminating the need for using hot melt seams during the carpet installation.

In a commonly used method of installing carpet the carpet is installed over a tackless strip secured to the floor around the walls of a room, the strip being provided with a series of upwardly protruding nails or tacks. The carpet is hooked onto the protruding nails of the strip on one side of the room and is then stretched before it is hooked up to the nails on the strip on the opposite side of the room. Since the carpet, and any padding which may be beneath it have a tendency to wrinkle after the carpet has been subjected to traffic, it is necessary to pull up the carpet, stretch it, trim it and fasten it again to the tackless strip. Installation of tackless strip is time-consuming and presents a problem if the floor is not a wooden floor to which the strip can be easily secured.

In order to avoid restretching of the carpet and even the padding or underlay, many installers have merely directly glued the carpet to the floor without using a carpet underlay. However, in the absence of padding, one walking on such an installed carpet does not have the same cushiony feeling imparted to him as is imparted when he walks on a carpet installed over a padding or carpet underlay. The carpet, instead, feels hard and unyielding under foot.

In an effort to improve the comfort of walking on the carpet surface, it has been suggested to glue a conventional carpet cushion or underlay directly to the floor. While this method has met with some success, it also suffers significant drawbacks. When applying the adhesive to the floor via a spray application, the overspray mist coats the wall, ceilings, curtains, etc. in the room being carpeted. In addition, the carpet cushion tends to absorb the adhesive and when the cushion is pulled away from the floor after it has been in place for a period of time, it delaminates with portions of the underlay tearing off and remaining adhered to the floor. As the carpet is subjected to traffic, the cushion has a tendency to become substantially permanently compressed because of the absorbed adhesive, and most of its cushioning capability is lost. This failure of the cushion to rebound is called memory failure.

U.S. Pat. No. 4,647,484 discloses a carpet underlay which is laid without the use of an adhesive between the floor and cushion. A double-faced tape formed of a Mylar polyethylene terephthalate film coated on each side with a pressure sensitive adhesive is secured to the upper surface of the cushion, which cushion consists of a rubber material formed onto a glass scrim. A release film is removed to expose the pressure sensitive adhesive onto which the carpet is then laid and secured by the adhesive.

The use of a pressure sensitive adhesive creates a relatively weak bond between the carpet and the cushion and such bond is not sufficiently strong to maintain a seam between two adjacent pieces of carpet laid over the underlay. To firmly join two carpet pieces in adjacent edge to edge relationship, a hot melt seam is usually utilized. While hot melt seams provide a strong carpet joint along adjacent carpet edges, their major drawback is that a visible line is evident along the seam. Additionally, the hot melt seam can usually be felt as one walks across the carpet seam. If a hot melt seam is not used to join the adjacent pieces of carpet, the carpet will tend to lift up at the joint or seam because the pressure sensitive adhesive bond is not sufficiently strong to firmly maintain the carpet in sealed relationship on the surface of the underlay.

Alternatively, the carpet cushion may be stapled or nailed to the floor, but this creates noticeable dimples in the surface of the cushion and if the carpet is made t adhere to the cushion, the recesses in the cushion caused by the nail or staple can be noticeable to the person walking on the carpet. Furthermore, the nails and staples may be uncomfortable when one steps on the carpet directly over them.

U.S. Pat. No. 4,557,774 describes a carpet cushion having a sealant disposed on both surfaces and a scrim webbing having pressure sensitive adhesive on both sides is adhered to each of the sealed cushion surfaces for securing the undersurface of the carpet cushion to the floor and for securing the carpet to the upper surface of the cushion. The pressure sensitive adhesive is non-permanent, so as to always allow for temporary lifting of the carpet wholly or in localized areas when desired.

The pressure sensitive adhesive based system disclosed in this U.S. Pat. No. 4,557,774, suffers from the same drawbacks with regard to carpet seams as discussed above. The patentee does disclose that if the carpet cushion is adhered to the floor by stapling or tacking, the dimples formed in the cushion will not be noticeable to the viewer of the carpet, provided that the carpet is not adhered to the carpet cushion in the areas of stapling or tacking.

SUMMARY OF THE INVENTION

It is an objective of this invention to overcome the deficiencies and disadvantages of the prior art systems described above.

It is an object of this invention to provide a carpet underlay which can be firmly secured to a floor and to the carpet which is laid over it and where the underlay and the carpet will not wrinkle as the carpet is subjected to traffic as people walk on it.

It is another object of this invention to provide a carpet underlay which will firmly adhere a carpet to its upper surface, including adjacent edges of two or more carpet sections whereby the seams formed along such adjacent carpet edges are essentially unnoticeable and there is no need to utilize a hot melt process to form such seams.

It is a further object of this invention to provide a comfortable carpet underlay which maintains its cushion ability condition during use and is long-wearing under heavy traffic conditions.

The advantages of this invention are realized by providing a carpet cushion underlay which includes a polyurethane foam cushion layer with a scrim layer attached to its undersurface by a solvent adhesive. The upper surface of the cushion also has a solvent adhesive applied thereto and a double adhesive coated film is securely affixed to the upper cushion surface by the solvent adhesive and the adhesive on the undersurface of the film. A release film is removably adhered to the upper layer of the double adhesive coated film, thus permitting the carpet cushion underlay to be rolled upon itself.

To apply the carpet underlay to the floor, a water-based adhesive is first trowelled onto the floor. The bottom surface of the carpet underlay having the scrim layer affixed thereto is then placed on the floor in contact with the adhesive. The release film is removed from the upper surface of the carpet cushion underlay and the carpet is laid upon the upper surface of the adhesively coated film. If the carpet is laid in two or more sections, adjacent edges of the carpet in contact with each other are firmly secured to the adhesive on the uppermost surface of the underlay so that the seams formed by the adjacent edges are virtually unnoticeable, even after the carpet is subjected to substantial wear. The aggressive nature of the double adhesive coated film provides a strong bond between itself and the overlaid carpeting.

BRIEF DESCRIPTION OF THE DRAWINGS

These and other advantageous features will become apparent to those skilled in the art from the following detailed description and the attached figures, wherein:

FIG. 1 shows a cross-sectional view of the carpet underlay in accordance with the invention; and FIG. 2 shows a cross-sectional view of the carpet underlay after installation of the carpet thereon.

DETAILED DESCRIPTION OF THE INVENTION

The preferred embodiments of the invention will be described in conjunction with FIGS. 1 and 2. In the figures, the reference numbers refer to the same structure throughout.

The carpet underlay of the invention is shown generally by reference number 10 in FIG. 1. The underlay is formed with a cushion layer 12, preferably of flexible, resilient polyurethane foam although other flexible polymeric foams, such as foam rubber, or known natural or synthetic fibrous cushioning materials may be utilized. It is important that the cushion layer 12 be sufficiently resilient and of a thickness such as to impart a comfortable, cushiony feeling to one walking on the carpet laid over the carpet cushion underlay of the invention. Such foams, their densities and their preferred thicknesses, usually from ¼ to 1 inch, are readily known in the art. Solvent adhesive layer 14 and 16 are applied to the top and bottom surfaces respectively of cushion layer 12 and each layer is firmly affixed to the cushion surface. The solvent based adhesive, preferably a thermoplastic adhesive, interlocks the foam cell structure to enhance the tear value of the foam.

A film 18 having an adhesive layer 20 firmly affixed to its undersurface is securely affixed to the solvent adhesive layer 14 on the cushion 12. Film 18 also has a similar adhesive layer 22 affixed to its upper surface and a release film 24 is disposed on the upper surface of adhesive layer 22. The release film permits the carpet underlay of the invention to be rolled up upon itself for transporting from the factory to the dealer to the installer and to the place where it is to be installed. The film 18 is also referred to as a double adhesive coated film wherein the film 18 is preferably a polymeric film, such as polyethylene terephthalate sold under the trademark Mylar by the E. I. duPont deNemours Company, Inc., or similar films that are strong and tear-resistant and capable of having an aggressive adhesive tenaciously adhering to its opposite surfaces. This aggressive adhesive permits the film to be firmly affixed to the cushion layer 12 through the solvent adhesive layer 14 already present on the cushion layer. The tenaciously adhering, aggressive adhesive layer 22 securely holds the carpet laid thereover in place. A layer of nonwoven mesh scrim 26 is attached to the undersurface of the cushion layer 12 by means of the solvent adhesive layer 16. The structure of the carpet cushion underlay of the invention is that described above and illustrated in FIG. 1 of the drawing.

In a typical application of the invention, as shown in FIG. 2, a water-based adhesive 28 is trowelled directly onto the floor 30 which is to be carpeted. Use of an adhesive which is trowelled onto the floor obviates the overspray mist problems. When using the trowelled-on adhesive, unnecessary damages to the walls, ceilings and draperies is avoided.

After the water-based adhesive 28 is in place, the carpet underlay 10 is placed onto the adhesive layer. The underlay 10 preferably has been precut to the shape of the floor to be covered prior to the trowelling of the water base adhesive onto the floor 30. The undersurface of the carpet underlay is thus in direct contact with the water based adhesive, which undersurface includes the scrim 26 and the solvent adhesive layer 16, and adheres to the floor 30.

The scrim layer is preferably Cerex nonwoven scrim which is available in the marketplace under that trademark. The scrim layer provides dimensional stability to the cushion.

The upper surface of the carpet underlay 10 has its release film 24 removed, exposing the upper layer 22 of the double coated adhesive film 18. An especially suitable double coated film 18 is one which is available commercially under the trademark DF-122 and is produced by Nylco Corporation, Nashua, N.H.

The attachment between the double adhesive coated film to the cushion 12 via a solvent adhesive layer 14 provides a strong bond between the cushion and the film 18 at the interface of the adhesive layer 20 and adhesive layer 14. This strong bond allows the aggressive adhesive 22 on the film 18, to securely bond to the underside of the carpet.

The aggressive nature of the adhesive layer 24 also obviates the need for a hot melt process for making carpet seams. When separate carpet sections are placed adjacent to each other along their edges on the carpet underlay of the invention, the seams remain practically invisible, even after extended periods of time in high traffic areas.

When the carpet is ready to be installed, the carpet is laid out in the room and is then cut to the appropriate size. Depending on the dimensions and configuration of the room, it may be necessary to use two or more sections of carpet to cover the room. Thus the carpet sections have to be laid adjacent to each other with their edges in contact. In a preferred method of installing the carpet after the carpet underlay of the invention has first been installed in the manner discussed above, a section of the carpet is folded back, a corresponding section of the release film 24 is removed, and the carpet is laid over the exposed adhesive 22. Another portion of the carpet is then pulled back, a corresponding portion of the release film 24 is removed, and that portion of the carpet is laid over the adhesive layer 22. The process is repeated until the entire carpet has been laid.

FIG. 2 shows a schematic cross-section of the cushion with a carpet laid on it. The carpet backing 40 may be of any conventional carpet backing material, woven or non-woven, and with or without a coating to lock in the carpet yarns and fibers, such as a latex coating of butadiene-styrene, polyvinyl chloride, acrylic, etc. The carpet itself may have a loop pile layer or be of cut pile yarns of cotton, wool, or any suitable material or synthetic fibers, such as nylon. The carpet backing is firmly secured to the adhesive layer 22 with the cut pile fibers 42 being the only portion of the completed installation exposed to view.

The use of a water based adhesive trowelled onto the floor for securing the carpet overlay of the invention to the floor at the interface of such trowelled adhesive with the scrim 26 and solvent adhesive 16, obviates the need for the use of tackless strips during installation. While the overlay is firmly secured to the floor, it is possible to remove the overlay intact when necessary.

The aggressive nature of the adhesive 20, 22 and the strong bond between the cushion 12 and the film 18 because of the double layers of adhesives 20 and 22, maintains the carpet in position relative to the cushion. Likewise, carpet seams are made simply by placement of the carpet edges of two or more carpet sections in adjacent relationship and securing them to adhesive 22. No hot melt seaming is necessary since the adjacent sections of carpet are held in place by the aggressive nature of the adhesive 22. The carpet seams remain practically invisible and are not evident to the touch when stepped on.

While the invention has been described in conjunction with particular embodiments, these embodiments are intended only to be exemplary. Various modifications may be made without departing from the scope of the invention as described in the appended claims.

I claim:

1. A carpet underlay consisting essentially of
   a) a resilient cushion layer having a solvent adhesive layer disposed on its upper and lower surfaces,
   b) a scrim layer secured to the bottom surface of said cushion layer by said solvent adhesive layer on the bottom surface of said cushion layer,
   c) a double adhesive coated film adhered along its undersurface to said solvent adhesive layer on the upper surface of said cushion layer, and
   d) a release film removingly adhered to the upper surface of said double adhesive coated film.

2. The carpet underlay as defined in claim 1 wherein said resilient cushion layer is a polyurethane foam.

3. The carpet underlay as defined in claim 1 wherein said film is a polymeric film.

4. The carpet underlay as defined in claim 3 wherein said polymeric film is a polyethylene terephthalate film.

5. The carpet underlay as defined in claim 2 wherein said film is a polymeric film.

6. The carpet underlay as defined in claim 5 wherein said polymeric film is polyethylene terephthalate.

7. A carpet and carpet cushion underlay installation retained in place on a floor surface after said floor surface has a water based adhesive trowelled thereon, comprising
   a carpet cushion overlay in adhering contact with the water based adhesive on the floor surface, said carpet cushion consisting essentially of
   a) a resilient cushion layer having a solvent adhesive layer disposed on its upper and lower surfaces,
   b) a scrim layer secured to the bottom surface of said cushion layer by said solvent adhesive layer on the bottom surface of said cushion layer,
   c) a double adhesive coated film adhered along its under surface to said solvent adhesive layer on the upper surface of said cushion layer, and
   a carpet laid on the upper surface of said double adhesive coated film and firmly bonded thereto by the aggressive adhesive on said film,
   said scrim layer and solvent adhesive layer on the bottom surface of said cushion layer being in adhering contact with the water based adhesive on the floor surface.

8. The carpet and carpet cushion underlay installation as defined in claim 7 wherein said carpet is in at least two sections, each of said sections having an edge in adjacent contacting relationship with an edge of the other section to form a seam along said contacting edges, said carpet sections being adheringly affixed to the aggressive adhesive on the upper surface of said double adhesive film so that said seam is virtually unnoticeable.

* * * * *